Jan. 11, 1966     J. J. RAPUZZI ETAL     3,229,028
COUPLING BETWEEN A TOW LINE AND OBJECT TOWED
Filed Jan. 22, 1964     3 Sheets-Sheet 1

INVENTORS.
JOHN J. RAPUZZI
ROBERT J. WOLFE
BY
Max D. Farmer
ATTORNEYS

INVENTORS.
JOHN J. RAPUZZI
ROBERT J. WOLFE
BY
ATTORNEYS

United States Patent Office 3,229,028
Patented Jan. 11, 1966

3,229,028
COUPLING BETWEEN A TOW LINE AND OBJECT TOWED
John J. Rapuzzi, Queens Village, and Robert J. Wolfe, Brooklyn, N.Y., assignors to the United States of America as represented by the Secretary of the Navy
Filed Jan. 22, 1964, Ser. No. 339,561
1 Claim. (Cl. 174—75)
(Granted under Title 35, U.S. Code (1952), sec. 266)

The invention described herein may be manufactured and used by or for the Government of the United States of America for governmental purposes without the payment of any royalties thereon or therefor.

This invention relates to couplings between a tow line and an object being towed by a ship in submerged condition. Such objects are commonly called "fish" and contain scientific apparatus, such as sonar equipment, which is connected electrically to the towing body by conductors incorporated in the tow cable.

Cable fittings now in use for coupling a towed object to a nylon and lead wrapped or covered towing cable, cannot be used successfully with a metal wire wrapped cable in the interior of which the circuit electrical conductors are incorporated, because in the new wire wrapped cables there are a large number of strength members which cannot be gripped in the limited space available in the "fiege" type fitting now in use. There are presently in use by the United States Navy, two different noses of the "fish" or object being towed, so that heretofore one coupling could not be used in attaching a wirewrapped cable to both types of fish.

An object of this invention is to provide a new and simple coupling for attaching the wire-wrapped towing cable easily to both types of fish noses with simple variations in the coupling means, which may be used successfully in the limited space already provided in present types of "fish" noses, which requires a minimum of different parts to couple a tow cable to any of the objects or "fish" now in use by the Navy, which may be used to couple any type of towing cable to any of the fish now in use, which provides a secure and durable but detachable connection of the cable to the "fish," and which is relatively simple, practical and inexpensive.

Other objects and advantages will appear from the following description of two embodiments of the invention and the novel features will be particularly pointed out in connection with the appended claim.

Figure 1:
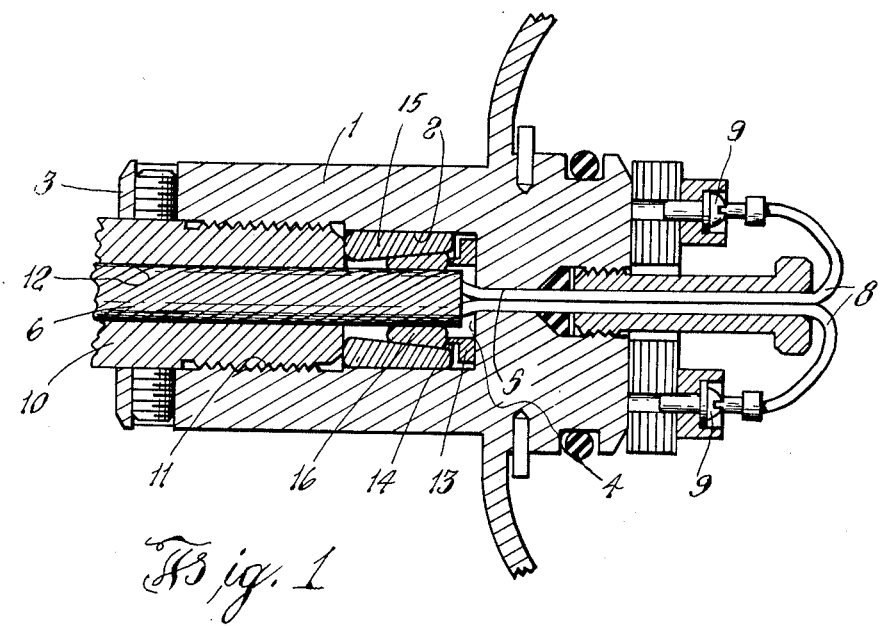
FIG. 1 is a longitudinal, sectional elevation of the nose of one type of fish or object being towed, with a wire wrapped cable coupled thereto in accordance with this invention.
Figure 2:
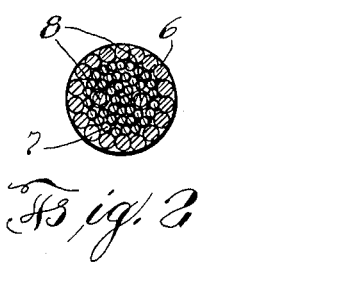
FIG. 2 is a cross-sectional elevation through the cable.

In the embodiment of the invention illustrated in FIGS. 1-7, the member 1 is secured in the nose of the object or fish being towed, and it has a recess 2 opening outwardly through a face 3. The inner end wall 4 of the recess has a passage 5 that leads into the fish. The tow cable 6 contains a bundle 7 of metal wires, surrounded by a helical winding of metal wires, and insulated conductor wires 8 are included in the bundle 7. The wires 8, after passing through the passage 5 in wall 4 are connected to terminals 9 within the fish as usual in devices of this type. The invention relates to a new and improved manner of anchoring the cable 6 within the recess 2. For this purpose, and referring particularly to FIGS. 1-9, the bore or recess 2 is smooth and cylindrical for a substantial part of its length from the end wall 4 of the recess, and from that smooth part toward the open end of the recess the wall of the recess 2 is threaded as at 9, but the threads end before the open end of the recess is reached. The wall of the recess 2, from the threaded part to the open end, is smooth, cylindrical and of a larger diameter from the threaded part to the open end of the recess. A sleeve 10, with a threaded end portion 11, and a central passage 12, is inserted into the open end of recess 2 and its threaded end portion threaded into the threaded part of recess 2.

Within the recess 2, an annular collar or ring 13 is disposed against the inner end wall 4 of member 1, and this ring has a flange 14 that projects in a direction toward the open end of the recess and in spaced relation to the periphery of the smooth part of the recess at it inner end. This ring or collar is shown separately in FIGS. 6 and 7. Also disposed in the smooth inner end of the recess and slidable along it, is a sleeve 15 shown separately in FIGS. 8 and 9 having a hexagonal outer periphery, the bore of which is divergent toward wall 4. The diameter of the larger end of the bore of sleeve 15 is greater than the outside diameter of flange 14 so that the inner end of sleeve 15 may overrun the exterior of the flange as shown in FIG. 1.

The cable 6 is passed through the bore 12 of sleeve 10, with an end beyond the inner end of the sleeve 10, until the wires 6 of the cable are close to the inner wall 4 and within the ring 13. A longitudinally split wedge ring 16 with slot 16a is disposed around the inwardly projecting end of the cable 6 and within the divering bore of sleeve 15. This split wedge ring is illustrated separately in FIGS. 3, 4, and 5. The inner wall or bore wall of this ring 16 is generally cylindrical and of a size to fit the cable 6, but this inner wall has transverse teeth 17 (FIG. 5) preferably with blunt outer apexes of the teeth, so that when this split wedge ring is disposed to encircle the cable and is compressed radially of the cable, the teeth will wedge themselves into the periphery of the cable and firmly adhere thereto without any sharp teeth that might damage the wires forming the exterior of the cable.

The exterior periphery of the ring 16 is frusto-conical with a taper that approximately fits the tapered inner wall of sleeve 15 and at its inner end it abuts the end of flange 14 of ring 13. When sleeve 10 is threaded into the recess 2, it pushes the sleeve 15 toward the end wall 4 and cams the split ring radially into clamping engagement with the periphery of the cable 6. This provides a clamp upon the cable that tests have disclosed to be adequate to prevent withdrawal of the cable from the recess 2. A set screw 18 in the part 1 releasably holds the sleeve 10 against unscrewing. Each of the sections of the sleeve 16 is slightly less than a half cylinder so that there is room for the sections to approach one another, when compressed radially, and firmly grip the cable.

Figure 10:
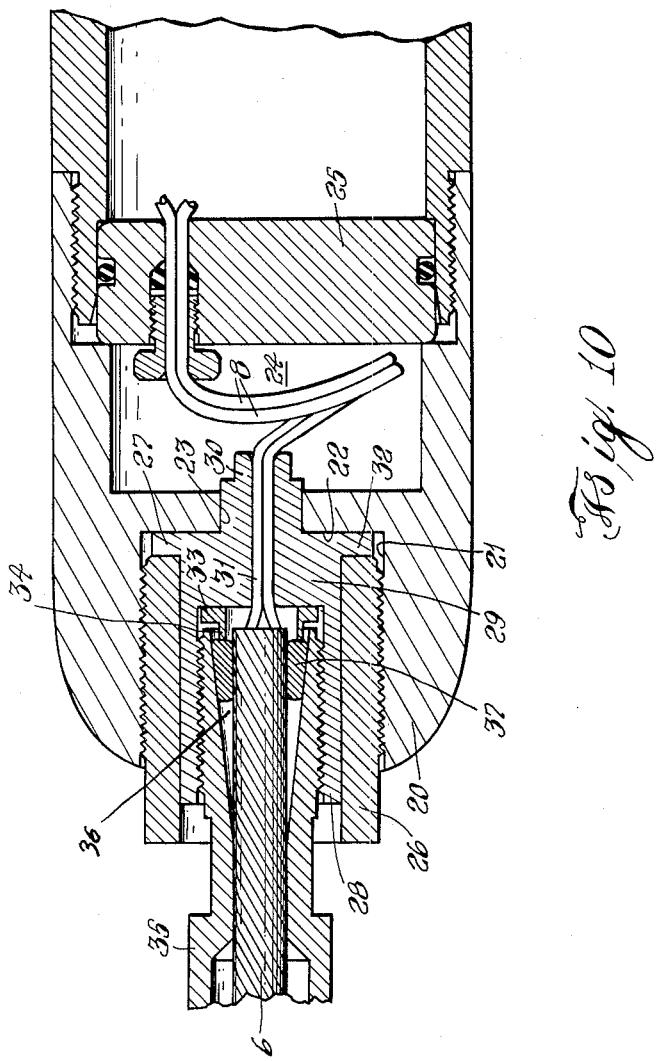
FIG. 10 is a longitudinal, sectional elevation of a modification of the coupling which is used with another type of nose of a "fish" being towed.

In the embodiment of the invention illustrated in FIG. 10, the member 20 is a part of the fish or object to be towed, and it has a recess 21 opening through one end thereof and extending to a wall 22 defining the inner end of the recess. The wall has a passage 23 that leads from recess 21 to a chamber 24 within the member 20. A partition 25 extends across the chamber 24, and the member 20, which is made of two sections that are screwed together, clamps the partition 25 between the sections as shown.

The cable 6 with conductor wires 8, which is the same as the cable 6 described and illustrated in connection with FIGS. 1-9, is detachably secured in the recess 21. For this purpose the recess 21 is threaded, and a sleeve 26 is threaded into the open end of the recess 21. Another sleeve 27 has a long tubular part 28 slidably fitting the interior bore of sleeve 26, and a head part 29 which fits against the end wall 22 and has a tubular boss 30 that passes through the passage 23 in the end wall. The conductor wires 8 from the cable 6 pass through a passage 31 in the head 29 into the chamber 24 and then through the partition 25 for electrical connection to the usual electrical mechanism (not shown) within the fish or object being towed. The head 29 has a flange 32 that abuts against the end wall 22, and the inner end of sleeve 26 abuts against a face of the flange 32 to secure the sleeve 27 securely against the end wall 22.

The inside wall of tubular part 28 is threaded nearly to but short of the head part 29, and a collar 33 abuts against the wall at the inner end of the bore of part 28. This collar has a flange 34 that extends in a direction away from the head 29 and is spaced from the bore of the tubular part 28. A sleeve 35 has an exterior, peripherally threaded end which is threaded into the bore of tubular part 28 nearly to but short of the collar 33. The bore 36 in sleeve 35 is tapered and diverges toward the collar 33, and the inner end of sleeve 35 extends nearly to, but preferably terminates short of actual contact with, collar 33. The cable 6 extends along the bore of sleeve 35 until the wires forming the exterior of the cable are encircled by the flange 34, and the conductor wires pass through the head part 29 and into chamber 24.

Figure 4:
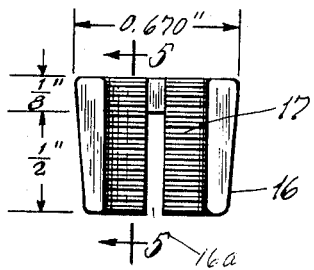
FIG. 4 is a plan of the same.
Figure 3:
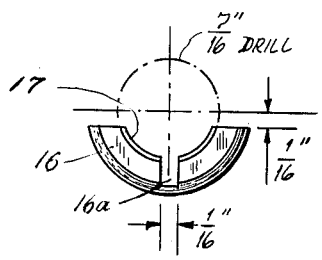
FIG. 3 is an end elevation of one-half of the split wedge plug, or ring used in the coupling of FIG. 1.
Figure 8:
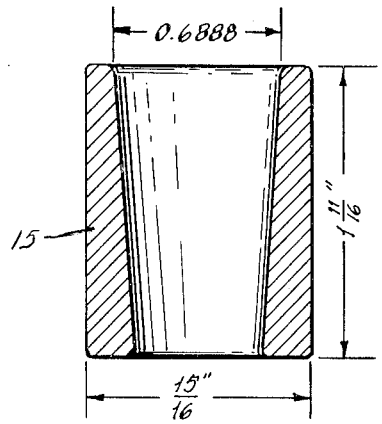
FIG. 8 is a sectional elevation of a sleeve that forms part of the coupling of FIG. 1.
Figure 9:
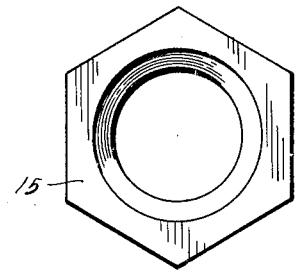
FIG. 9 is an end elevation of the same.
Figure 6:
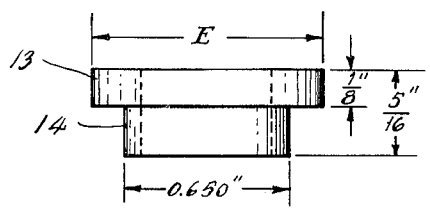
FIG. 6 is a plan of the collar employed.
Figure 7:
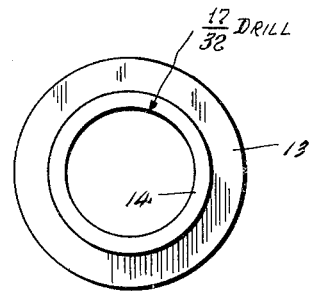
FIG. 7 is an end elevation of the collar.
Figure 5:
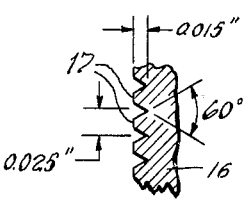
FIG. 5 is a longitudinal sectional elevation of the same.

A longitudinally split wedge ring 37, identical with wedge ring 16 of FIG. 1 and shown separately in FIGS. 3-5, is disposed within bore 36 on the end portion of the cable, upon the wires 8 thereof, and the outer periphery of ring 37 has a taper that approximately fits that of the bore 36, so that as the sleeve 35 is threaded inwardly, its tapered bore 36 will cam the split sections of wedge ring 37 into firm clamping engagement with the periphery of cable 6 and secure it against removal until sleeve 35 is unscrewed. The sections of ring 37 abut against the free end or edge of flange 34 which prevents ring 37 from endwise movement, as the sleeve 35 cams the sections of the wedge ring radially into clamping contact with the cable 6.

The coupling of this invention enables the cable to be attached to "fish" or objects being towed that have different fitting constructions to which the coupling is made.

It will be understood that various changes in the details, materials, and arrangements of parts, which have been hereindescribed and illustrated in order to explain the nature of the invention, may be made by those skilled in the art within the principle and scope of the invention, as expressed in the appended claim.

We claim:

A coupling between an object to be towed and a tow cable having electrical conductors encased therein and connectable to the interior of said object, which comprises:

said object having therein an outwardly opening recess in which an end of said cable may be received and anchored therein, and also having a passage from the inner end portion of said recess to the interior of said object through which the conductors of any such cable may pass into the interior of said object, an annular ring disposed in the inner end portion of said recess and having a flange projection extending toward the open end of said recess, a longitudinally split wedge ring having an approximately cylindrical inner passage of a size to closely receive within it one end of said cable, with the conductors of said cable extending further toward the inner end of the recess, and having its outer periphery generally frusto-conical with its smaller end diameter nearest to said open end of said recess, and abutting endwise against said flange of said annular ring, a member threaded into and along the open end portion of the recess, and a sleeve disposed between said member and the closed end of the recess, said sleeve having an axial passage therethrough which is frusto-conical in shape, diverging toward the closed end of the recess and overrunning the frusto-conical surface of said wedge ring for camming said wedge ring into clamping contact with any cable within said ring when said member is adjusted into and along said recess.

References Cited by the Examiner

UNITED STATES PATENTS

| 1,950,317 | 3/1934 | Luneburg | 24—126 X |
| 2,009,318 | 7/1935 | Highfield | 174—94 X |
| 2,886,626 | 5/1959 | Burnett et al. | 174—70 X |

FOREIGN PATENTS

| 178,112 | 9/1953 | Austria. |
| 966,693 | 9/1957 | Germany. |

ROBERT K. SCHAEFER, *Primary Examiner.*

JOHN F. BURNS, *Examiner.*

W. B. FREDRICKS, *Assistant Examiner.*